Dec. 26, 1950 P. L. WILHELM ET AL 2,535,249
ELECTRIC PSYCHOMETER
Filed Feb. 26, 1948 2 Sheets-Sheet 1

INVENTORS
PAUL L. WILHELM &
FRANK DONALD BURNS.
BY Oltsch & Knoblock.
ATTORNEYS

Dec. 26, 1950 P. L. WILHELM ET AL 2,535,249
ELECTRIC PSYCHOMETER
Filed Feb. 26, 1948 2 Sheets-Sheet 2
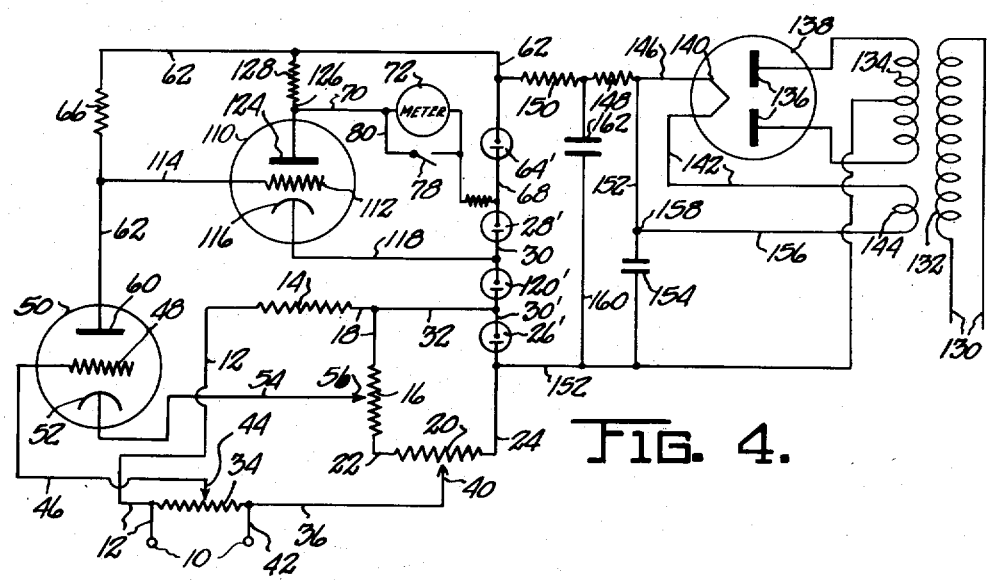
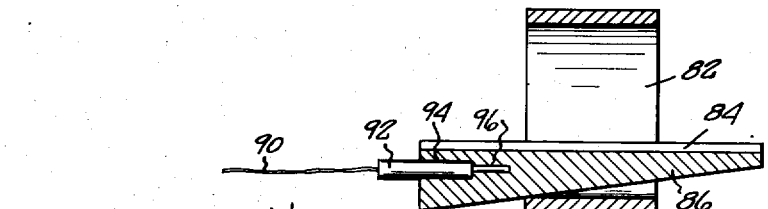
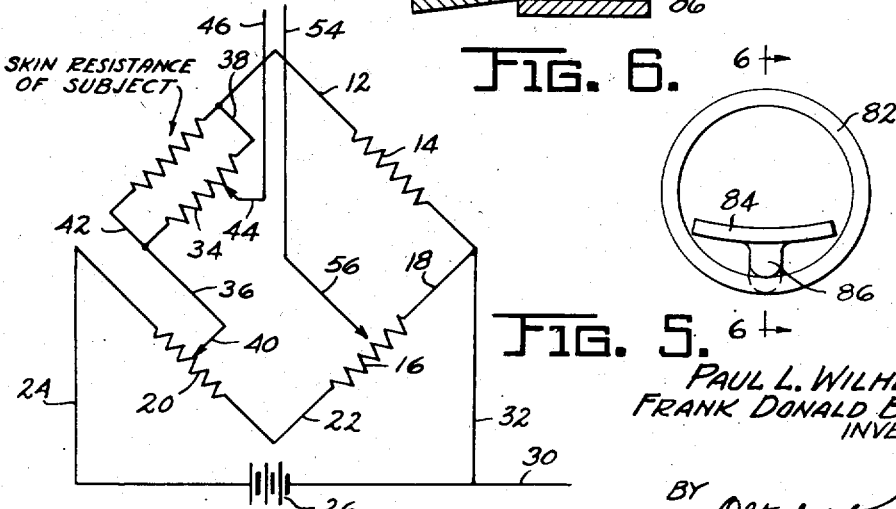
PAUL L. WILHELM &
FRANK DONALD BURNS.
INVENTORS.
BY Oltsch & Knoblock
ATTORNEYS Patented Dec. 26, 1950

2,535,249

UNITED STATES PATENT OFFICE 2,535,249

ELECTRIC PSYCHOMETER

Paul L. Wilhelm, Michigan Township, and Frank Donald Burns, Michigan City, Ind.

Application February 26, 1948, Serial No. 11,264

9 Claims. (Cl. 128—2.1)

This invention relates to improvements in electric psychometers, sometimes known as lie detectors. The present device utilizes the phenomenon that the resistance of the skin of an individual changes with an emotional change in the human body. We are aware that devices for detecting dishonest from truthful statements of an individual have been provided. These devices, to the best of our knowledge, usually have responded to cardiac and pneumatory reaction of an individual. Such prior devices, while effective for their intended purpose, have been subject to various disadvantages and limitations. Among such disadvantages have been the high cost thereof, the delicate construction thereof, and the large size and heavy weight thereof which has tended to preclude desired portability. Other disadvantages of previous devices have been that they have not been adjustable as to sensitivity according to the personal reactions of different individuals in most cases, and, further, that the attachments to the body of the individual necessary for their use have produced discomfort of the subject and thus required that the tests of the subject by use of the device be limited as to time.

The primary objects of this invention are to provide a device of this character which is comparatively inexpensive so that it may be available for use by law enforcement and other agencies having limited funds, which is light in weight and portable so that it may readily be transported from place to place, and which is rugged in construction to resist damage incident to use thereof and to transportation thereof.

A further object is to provide a device of this character with means for adjusting the sensitivity of response thereof so that the variations in the reactions of different individuals may be compensated and accurate readings secured for all subjects, and which is further provided with convenient means for calibrating the device.

A further object is to provide a device of this character which may use a sensitive but comparatively rugged measuring element, such as a milliammeter, and which includes means to protect the measuring device automatically in the event that the current being measured exceeds the range of the instrument during use.

A further object is to provide a device of this character with means adapted to be worn by the subject for detecting variations in skin resistance, which are of novel construction, which may be applied and removed easily and quickly, and which may be worn for extended periods of time to facilitate extended questioning of the subject without discomfort to the subject.

A further object is to provide a device of this character which can be used by individuals having little familiarity with electrical apparatus without requiring extensive personal instructions to such individual, and which is constructed from standard electrical parts readily available at firms dealing in electrical and radio equipment.

A further object is to provide a device of this character which will not be damaged by accidental energization thereof over long periods of time and in which no danger exists that the subject will be harmed or injured by electrical shock.

Other objects will be apparent from the following specification.

In the drawing:

Fig. 4 is a circuit adapted for operation by alternating current.

Fig. 5 is an end view of the skin contacting electrode used in the device.

Fig. 6 is a longitudinal sectional view taken on line 6—6 of Fig. 5.

Fig. 7 is a circuit illustrating the manner in which the various elements of applicants' device are connected, to provide a modified Wheatstone bridge.

Figure 2:
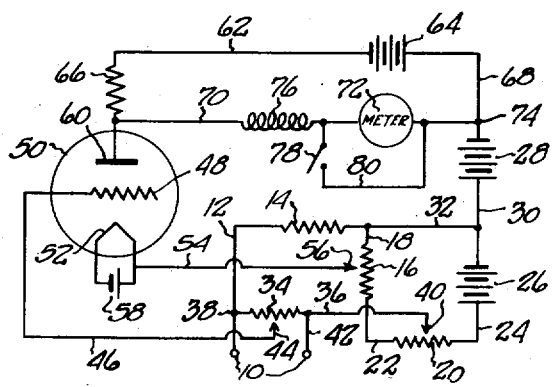
Fig. 2 is a circuit powered by batteries, embodying the invention and utilizing one stage of amplification.

Referring to the drawing, and particularly to Fig. 2 thereof which illustrates one embodiment of the invention, the numeral 10 designates the terminals to which the skin engaging device, such as the device shown in Figs. 5 and 6, is adapted to be connected. One of these terminals 10 is connected by a lead 12 with a resistor 14, and the resistor 14 is connected in series with a resistor 16 by means of a lead 18. The resistor 16 in turn is connected with a resistor 20 by means of a lead 22. The resistor 20 is connected by a lead 24 in series with a battery 26. A second battery 28 is connected in series with the battery 26 by a lead 30, and a lead 32 branches from the lead 30 between the two batteries 26 and 28 and is tapped to the conductor or lead 18 between the resistors 14 and 16. A resistor 34 is interposed in a lead 36 tapped to the lead 12 at 38. The lead 36 will include a flexible portion which terminates in a slider member 40 adapted to engage the resistance 20 and cooperating therewith to provide a variable resistor for zero adjustment or centering. The second terminal 10 is tapped to the lead 36 between the resistance 34 and the terminal 40 by a lead 42.

A slider 44 for sensitivity adjustment cooperates with the resistance 34 and is connected by a lead 46 with the grid 48 of a signal amplifying electron emission tube 50. The cathode 52 of the tube 50 is connected by a lead 54 with a second zero adjusting or centering slider element 56 cooperating with the resistor 16. In the preferred form the circuit to the cathode will include a battery 58.

The plate 60 of the tube 50 is connected by a lead 62 with a plate battery 64, there preferably being a fixed resistor 66 connected in the lead 62 between the tube and the battery 64. The lead 68 connects the battery 64 in series with the battery 28. A lead 70 is tapped from the lead 62 at the terminal of the plate 60 and between the plate 60 and the resistor 66. This lead 70 serves to connect a measuring instrument, such as a milliammeter 72 or a recorder, in the circuit in parallel to the resistor 66 and the battery 64 with its opposite end being tapped at 74 to the lead 68. The coil 76 of a relay is interposed in the lead 70 and the armature 78 of the relay constitutes or controls a switch interposed in a shunt circuit 80 in parallel with the measuring element 72.

The elements which respond to the skin resistance of the subject are best illustrated in Figs. 5 and 6 and comprise two parts. One part is preferably in the form of a ring or short tube 82 formed of conductive material, the diameter of whose bore is slightly greater than the inner peripheral diameter of a finger ring of the largest size offered by jewelers. The other part comprises an elongated conductive metallic plate 84 of concavo-convex form in transverse configuration and provided at the center of its convex face with a longitudinal integral rib 86 of tapered form. A flexible electrical lead 90 is electrically connected with a plug 92 which fits within a socket formed in the electrode 84, 86. In the preferred form the socket will be constructed as illustrated in Fig. 6 with a large diameter portion 94 thereof adapted to receive the large portion of a plug 92 and with a small diameter inner socket portion 96 slightly eccentric with respect to the socket portion 94 and adapted to receive a reduced terminal projection of the plug 92.

Figure 1:
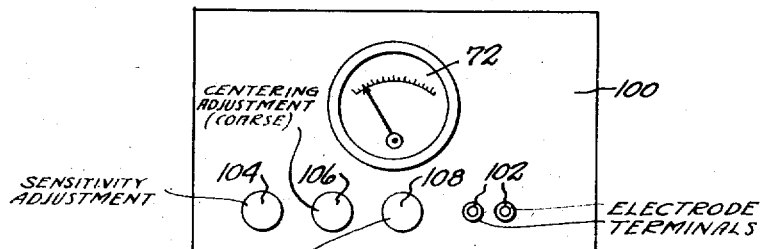
Fig. 1 is a front elevation of the instrument mounted in a case and provided with indicating means and control means.

The device is adapted to be mounted in a housing or casing 100, as best illustrated in Fig. 1. This housing will mount sockets 102 adapted to detachably receive plugs (not shown) which are mounted upon the lead 90 to the electrodes. The sockets 102 will constitute the terminals 10 illustrated in the circuit in Fig. 2. The casing 100 will mount the measuring member or milliammeter 72 in its front wall to be readily visible by the operator. A plurality of knobs 104, 106 and 108 will be mounted upon the casing 100. These knobs will be connected respectively with the slider 44, the slider 56 and the slider 40, to control the adjustment of said sliders. The front panel mounting of these knobs permits their use while viewing the meter 72 to facilitate the adjustment and control of the operating circuit.

Two finger electrodes are employed, being mounted upon different fingers and each of which has only one lead 90 connected thereto, the circuit being completed through the skin of the subject. It will be apparent that the finger electrodes can be used very simply by sliding the retainer ring 82 over the finger of a subject and then sliding the elongated electrode 84 within that retainer ring to a position in which it engages the skin of the user with a positive but comfortable electrical contact.

It will be observed that the circuit is essentially a Wheatstone bridge circuit in which the resistors 14, 16 and 20 constitute three of the legs of the circuit and the electrical resistance of the skin of the subject forms the fourth resistor in the circuit. The resistor 34 is connected in parallel with the resistance formed by the skin of the subject. The output of the bridge is conducted through the leads 46 and 54 to the electronic tube 50 by which the current is amplified to a value sufficient to energize the measuring device 72. The current values in this instance can be kept at a very low level, thus insuring against electrical shock or injury to the subject and yet are sufficiently high to permit the use of a fairly rugged type of electrical instrument, such as a milliammeter, as the measuring means. In this connection, the amplification by the electron tube is sufficient to raise the signal strength for actuating the meter 72 from a very small value to which only a galvanometer would be responsive to the higher value, thus making it possible to use the comparatively rugged milliammeter in place of a simple galvanometer.

One of the outstanding advantages of the device is that it may be adjusted to compensate for differences in the skin resistance of different subjects by varying the position of the slider 44 upon the resistance 34. Thus in instances where the skin resistance of two subjects vary, the slider can be adjusted during initial preliminary testing with each subject to establish the conditions required for use as to that subject, thus setting up the instrument to give, upon the metering element 72, indications which are equal in amplitude to those of a subject whose skin resistance is at a substantially different electrical value.

A second important feature of this device is the provision of means for centering or balancing the instrument. Thus, whenever any adjustment of the sensitivity slider 44 is made, it will affect the balance of the bridge and the zero positioning of the pointer of the milliammeter 72. The sliders 40 and 56 constitute these centering means. One thereof may be provided for relatively coarse adjustment, and the second thereof may be constructed for relatively fine adjustment. Thus by the manipulation of the proper ones of the knobs 106 and 108 controlling the sliders 56 and 40, the indicator needle can quickly be restored to a zero position.

Another important advantage of the device is the provision of the relay 76, 78 for controlling the shunt circuit 80. This relay can be so constructed that in the event the current flow through the line 70 to the meter 72 reaches or exceeds the maximum current which the instrument will carry, the relay will operate to close the normally open shunt circuit 80, thereby preventing the possibility that the meter 72 will be subjected to any damaging current flow condition.

The ability of the device to be operated by batteries, the simplicity of the skin contacting electrodes, the simplicity of the adjustments and of the operating circuit, all make for compactness and light weight of a unit, rendering it both portable and rugged as well as inexpensive in cost.

In the use of the device two electrode units, as illustrated in Figs. 5 and 6, are fastened on two fingers of the subject, being connected in the circuit as the sockets 102. A small amount of electric current is passed through the body while the resistance of the body is balanced by the adjustable resistor 44 in the bridge circuit. In other words, after the individual has been placed at rest after the electrodes have been attached to his fingers, the rheostat 44 is adjusted by manipulation of the proper one of the knobs 104, 106, 108, followed by adjustment of the other knobs which serve to control the rheostats 40 and 56 to accurately center the position of the needle of the meter 72. The latter adjustments are preferably performed by moving said sliders to a zero position and then progressively shifting them until the desired reading is indicated upon the meter 72, that is, a centered reading. The sensitivity setting can then be checked by having the subject take a deep breath which will produce a certain actuation of the meter under normal conditions. If the meter operation exceeds or falls below this normal, a change in the setting of the slider 44 may be made, followed by changes in the setting of the sliders 40 and 56 for centering purposes, and the sensitivity can then be checked again.

In testing a subject it is desirable that a fixed set of questions which can be answered "Yes" or "No" should be prepared in advance, certain of which relate to nonpertinent matters, and notes can be made of the readings of the meter 72 in conjunction with the answering of such nonpertinent questions. Such reading can be utilized to establish the normal reaction of the subject to questioning. Several of the questions interspersed among the list to be asked will pertain to the subject matter of the investigation. It is desirable that this list of questions be asked of the subject more than once but preferably not more than three times, and notes should be taken of the readings applying to each question on each occurrence of its asking. It is important that sufficient time be allowed between answers to permit the needle or indicator of the measuring unit 72 to return to a rest position normal to the subject before another question is asked. During the questioning the subject should remain quiet and relaxed, and his attention should not be diverted from the questions by any external means, and preferably not by any sound or noise. The results of the readings must be interpreted from experience and any possibilities that an abnormal reaction has been caused by any condition, except an untruthful answer, must be ascertained. Thus if physical movement has occurred, or if interference has occurred, or if it appears that the subject is frightened by the machine, or if it appears that the question asked may be creating a mental association in the mind of the subject with a fact situation different from that being investigated, such conditions may account for abnormality of the response or reaction of the subject. In the interpretation of the readings it must also be borne in mind that there is no set of abnormal reactions to indicate that a lie has been told, and the operator through experience can readily judge when a lie has been told, according to the difference between a normal reaction and an abnormal reaction caused by lying. As a general rule, however, it will be found that, where the subject lies, the abnormal reaction shown will be at least twice as much as the normal reaction on the same test. In other words, if normal reaction of the subject gives meter readings from zero to three, then meter readings of six or more tend to indicate that a lie has been told.

Figure 3:
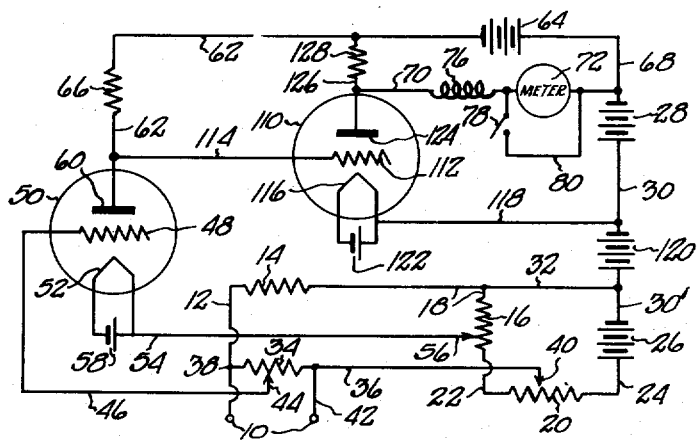
Fig. 3 is a circuit illustrating a modified embodiment of the invention utilizing two stages of amplification.

The circuit shown in Fig. 3 differs from the circuit shown in Fig. 2 essentially by the fact that two stages of amplification are provided instead of the single stage of amplification as shown in Fig. 2. The parts of Fig. 3 which are similar to the parts of Fig. 2 bear the same reference numerals. The second stage of amplification is provided by an electron tube 110 whose grid 112 is connected by a lead 114 tapped from the lead 62 at a point between the plate 60 of the first tube 50 and the resistor 66 in lead 62. The cathode 116 of the tube 110 is connected by a lead 118 with lead 30 between the battery 28 and a battery 120. The lead 32 in this circuit is tapped with the lead 30' at a point between the battery 120 and the battery 26. The cathode circuit includes the battery 122 similar to the battery 58 used with the electron tube 60. The plate 124 of the tube 110 is connected by a lead 126 with the lead 62 between the resistance 66 and the battery 64 in the lead 62. The lead 126 has a resistance 128 interposed therein. The lead 70 is connected with the lead 126 between the resistance 128 and the tube plate 124 and extends in parallel with the battery 64 having its opposite end connected with the lead 68 between the batteries 64 and 28. The relay 76, 78 is provided in conjunction with the lead 70 and the shunt lead 80 in the same manner as in the Fig. 2 embodiment, said shunt lead 80 be adapted for connection across the opposite terminals of the measuring meter 72. This embodiment of the invention possesses all of the advantages and is constructed to operate in the same manner as the device shown in Fig. 2, differing therefrom solely with respect to the number of stages of amplification.

Fig. 4 illustrates a device which is adapted to be actuated from an alternating current source with which the leads 130 are connected. The power circuit 130 has the primary coil 132 of a transformer interposed therein. The transformer may be of any suitable type and preferably has two secondary coils. One secondary coil 134 has its opposite ends connected with the two anodes 136 of a full wave rectifier tube 138. The cathode 140 of the rectifier tube 138 is connected by a lead 142 with a second secondary coil 144 of the transformer. The other terminal of the cathode is connected by a lead 146 with the lead 62 of the psychometer circuit and has resistances 148 and 150 connected or interposed therein in series relation. A lead 152 is tapped from the lead 146 between the cathode 140 and the resistance 148 and has a filtering condenser 154 interposed therein. The lead 152 is connected with the lead 24 of the psychometer circuit. The second terminal of the secondary coil 144 is connected by a lead 156 with the lead 152 to which it is tapped at 158 between the cathode 140 and the filtering condenser 154. A lead 160 is tapped to the lead 146 between the resistances 148 and 150 and is tapped at its opposite end to the lead 152 between the condenser 154 and the point of connection of the lead 152 with the psychometer circuit. The lead 160 has a filtering condenser 162 interposed therein.

In this embodiment of the invention wherein the psychometer circuit is substantially the same as that shown in Fig. 3 involving the use of two stages of amplification provided by the tubes 50 and 110, respectively, it will be observed that the various batteries utilized in the Figs. 2 and 3 devices are omitted, and in their place are used voltage regulator tubes. Thus voltage regulator tubes 26′, 120′, 28′ and 64′ are used in Fig. 4 in place of the batteries 26, 120, 28 and 64, respectively, utilized in the embodiment illustrated in Fig. 3.

The operation of this device is the same as the operation described above with the exception that the device is operated by alternating current and therefore must be connected with a source of power and have built into it, in addition to the basic psychometer circuit, the transformer 132, 134, 144, the full wave rectifier 138 and the other supply circuit elements including the filtering condensers 154 and 162. However, these changes do not substantially increase the weight, size or cost of the unit and do not detract from the accomplishment of the advantages hereinabove referred to by the device.

While the preferred embodiment of the invention has been illustrated and described herein, it will be understood that changes may be made therein within the scope of the appended claims without departing from the spirit of the invention as defined in the claims in this application.

We claim:

1. An electric psychometer comprising an electric circuit, a Wheatstone bridge connected in said circuit and including input and output leads and a plurality of resistors forming legs of said bridge, electrode means adapted for engagement with the skin of a person and so connected with said bridge that the resistance of the skin forms one leg of said bridge, an amplifier in said circuit and connected with the output leads of said bridge, and a meter in said circuit for measuring the output of said amplifier, a normally open shunt connected in said circuit around said meter, and a relay responsive to the flow of current to said meter and adapted to close said shunt when current flow reaches a predetermined value.

2. An electric psychometer comprising an electric circuit, a Wheatstone bridge connected in said circuit and including input and output leads and a plurality of resistors forming legs of said bridge, electrode means adapted for engagement with the skin of a person and so connected with said bridge that the resistance of the skin forms one leg of said bridge, an amplifier in said circuit and connected with the output leads of said bridge, and a meter in said circuit for measuring the output of said amplifier, and means responsive to a predetermined electrical condition for shunting said meter.

3. An electric psychometer comprising an electric circuit, a Wheatstone bridge connected in said circuit and including input and output leads and a plurality of resistors forming legs of said bridge, electrode means adapted for engagement with the skin of a person and directly connected with said bridge so that the resistance of the skin forms one leg of said bridge and said bridge is instantaneously responsive to variations in skin resistance, an amplifier in said circuit and connected with the output leads of said bridge, and a meter in said circuit for measuring the output of said amplifier, one of said resistors being a variable balancing resistor and including a slider connected to one of said output leads for centering said meter.

4. An electric psychometer comprising an electric circuit, a Wheatstone bridge connected in said circuit and including input and output leads and a plurality of resistors forming legs of said bridge, electrode means adapted for engagement with the skin of a person and directly connected with said bridge so that the resistance of the skin forms one leg of said bridge and said bridge is instantaneously responsive to variations in skin resistance, an amplifier in said circuit and connected with the output leads of said bridge, and a meter in said circuit for measuring the output of said amplifier, said bridge including a variable resistor connected in parallel with said electrode means and having a slider connected to one bridge output lead and adjustable to vary the sensitivity of said bridge.

5. An electric psychometer comprising an electric circuit including energizing means, a plurality of resistors connected in said circuit, electrode means adapted to engage the skin of a person and directly connected in said circuit, said resistors and electrodes cooperating to form a Wheatstone bridge circuit in which the skin of the person constitutes one leg of said Wheatstone bridge, said bridge being instantaneously responsive to variations in skin resistance an amplifier in said circuit for amplifying the output of said Wheatstone bridge, means in said circuit for measuring the output of said amplifier, and means for adjusting said bridge to vary the sensitivity of said circuit.

6. An electric psychometer comprising an electric circuit including energizing means, a plurality of resistors connected in said circuit, electrode means adapted to engage the skin of a person and directly connected in said circuit, said resistors and electrodes cooperating to form a Wheatstone bridge circuit in which the skin of the person constitutes one leg of said Wheatstone bridge, said bridge being instantaneously responsive to variations in skin resistance an amplifier in said circuit for amplifying the output of said Wheatstone bridge, means in said circuit for measuring the output of said amplifier, and means for adjusting said bridge to center said measuring means.

7. An electric psychometer comprising an electric circuit including energizing means, a plurality of resistors connected in said circuit, electrode means adapted to engage the skin of a person and directly connected in said circuit, said resistors and electrodes cooperating to form a Wheatstone bridge circuit in which the skin of the person constitutes one leg of said Wheatstone bridge, said bridge being instantaneously responsive to variations in skin resistance an amplifier in said circuit for amplifying the output of said Wheatstone bridge, means in said circuit for measuring the output of said amplifier, means for adjusting said bridge to vary the sensitivity of said circuit, and means for adjusting said bridge to center said measuring means.

8. In an electric psychometer, a Wheatstone bridge circuit including a pair of input leads and a pair of output leads, a pair of variable resistors having resistance elements connected in series between said input leads and each having a slider, a third variable resistor having a slider and a resistance element, a fixed resistor connected at one input lead and in series with the resistance element of the third resistor and with the slider of that one of the first named resistors connected to the other input lead, one output lead being connected to the slider of the other of said first named resistors, the other output lead being connected to the slider of the third resistor.

9. In an electric psychometer, a Wheatstone bridge circuit including a pair of input leads and a pair of output leads, a pair of variable resistors having resistance elements connected in series between said input leads and each having a slider, a third variable resistor having a slider and a resistance element, a fixed resistor connected at one input lead and in series with the resistance element of the third resistor and with the slider of that one of the first named resistors connected to the other input lead, one output lead being connected to the slider of the other of said first named resistors, the other output lead being connected to the slider of the third resistor, and electrode means connected to said bridge circuit in parallel to the resistance element of the third resistor, said electrode means being adapted for engagement with the skin of a person whereby the resistance of the skin influences said bridge circuit.

PAUL L. WILHELM.
FRANK DONALD BURNS.

REFERENCES CITED

The following references are of record in the file of this patent:

UNITED STATES PATENTS

| Number | Name | Date |
|---|---|---|
| 1,761,476 | Hathaway | June 3, 1930 |
| 2,110,392 | Dorr | Mar. 8, 1930 |
| 2,308,933 | Raesler | Jan. 19, 1943 |
| 2,339,579 | Milne et al. | Jan. 18, 1944 |
| 2,379,955 | Eilenberger | July 10, 1945 |